J. C. GOOLD.
Thill-Coupling

No. 198,376. Patented Dec. 18, 1877.

Witnesses:
Prentice Rodgers
Chas. J. Silvester

John C. Goold
by his atty Alex Alfrick
Inventor.

UNITED STATES PATENT OFFICE.

JOHN C. GOOLD, OF ALBANY, NEW YORK.

IMPROVEMENT IN THILL-COUPLINGS.

Specification forming part of Letters Patent No. 198,376, dated December 18, 1877; application filed August 16, 1877.

*To all whom it may concern:*

Be it known that I, JOHN C. GOOLD, of the city and county of Albany, in the State of New York, have invented certain new and useful Improvements in Shaft-Coupling for Carriages, which improvements are fully set forth in the following specification and accompanying drawings, in which—

Figure 1:
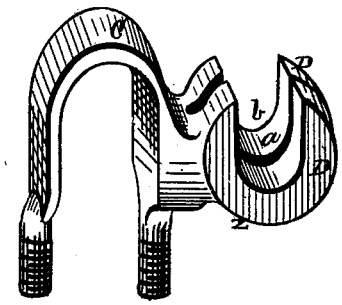
Figure 2:
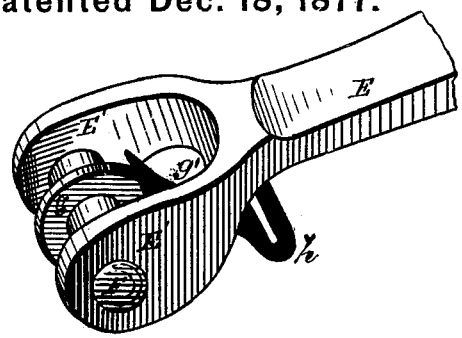
Figure 3:
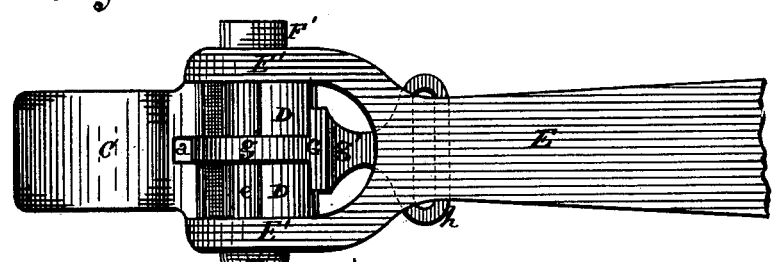
Figure 4:
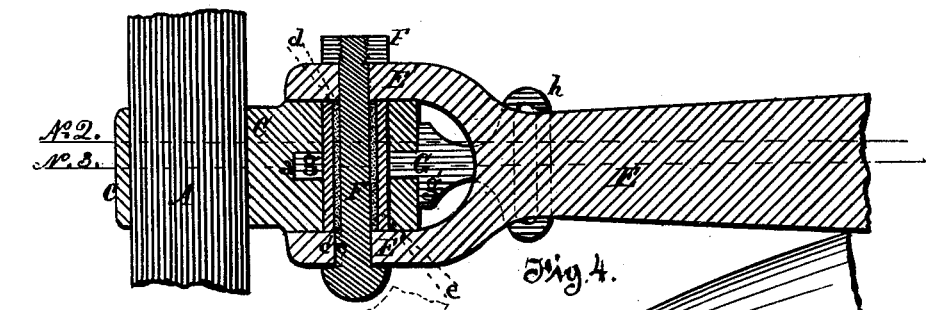
Figure 5:
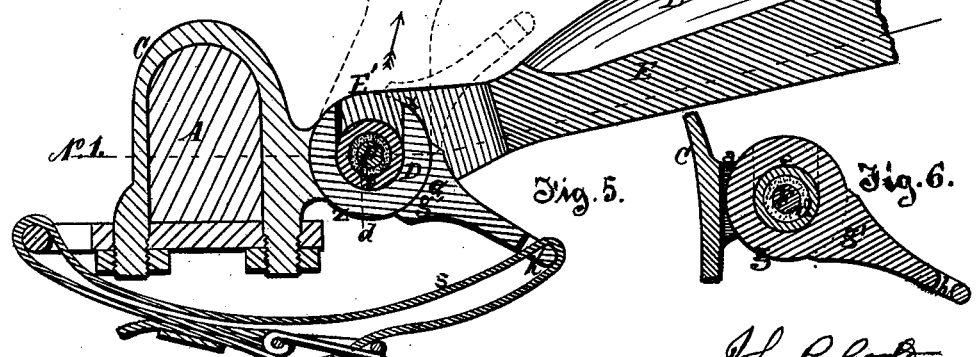
Figure 6:

Figure 1 represents a perspective view of the clip portion of the coupling. Fig. 2 is a perspective view of the shaft or pole end of the coupling. Fig. 3 is a horizontal view of the coupling when the parts are connected. Fig. 4 is a horizontal sectional view of the same, taken at line No. 1, in Fig. 5. Fig. 5 is a sectional elevation taken at line No. 2 in Fig. 4. Fig. 6 is a sectional elevation taken at line No. 3 in Fig. 4.

The object of my invention is to produce a device by which to connect or disconnect the shafts or pole of a carriage with the axle of the same, so that the parts forming the coupling may be readily connected and held locked together, and at the same time produce a hinge-joint in which there will be no wear resulting from friction of metal on metal.

In the drawings, A represents the axle-bed of the carriage. B is the rear end of a shaft or pole, and C a clip for binding the iron and wood portions of the axle together. Made preferably solid with the clip C is the draft-bracket, composed of the cup-brackets D D, having a slot, $a$, between. The front and lower portions of the said brackets are made with a curvature corresponding with a true circle from $x$ to $z$. Made central in said bracket, and transversely to slot $a$, is the draft-slot $b$, having its bottom made in a semicircular form, and sides perpendicular and parallel with each other, as shown in Figs. 1 and 5.

Made with the shaft or pole iron E are the draft-ears E' E', having a diameter equal to the diameter of the draft-brackets D D, and set to a distance apart sufficient to nicely receive the said draft-bracket between, as shown in Figs. 2 and 3. The center of the said ears is pierced to receive the draw-bolt F, which bolt is secured in said ears by the nut F', and is prevented from turning by the feather $c$, made with said bolt, and engaging with a slot, $c'$, made in one of the said ears. The portion of the draw-bolt F between the ears E' E' of the shaft-iron is inclosed by a tubular rubber packing, $d$, contained within the tubular sleeve $e$, Figs. 4 and 5. Swinging on the tubular sleeve $e$, at a point corresponding with the slot $a$ of the draw-bracket D D, is the tumbler-latch G, composed of ring $g$ and latch $g'$. The ring $g$ is made with an outer diameter equal to that of the draw-brackets D D, and with a bore equal to the diameter of the sleeve $e$, and with a width equal to the width of slot $a$ in the draw-bracket. The latch $g'$ is made solid with ring $g$, and consists of shoulders made with a curvature corresponding with the curvature of the draw-bracket D D, so as to nicely fit the same. Made in one piece with the said tumbler-latch is the loop $h$, adapted to receive strap $s$, for binding the said tumbler-latch down in position shown in Fig. 5.

When it is desired to connect the shafts or pole with the axle, the forward ends of said pole or shafts are to be raised, and the tumbler-latch G is to be turned or swung on the bushing upward and against the lower side of the shaft or pole iron until the lower side of said latch is above a plane with the axis of the draw-bolt F, as shown by dotted lines in Fig. 5, when the ears E' E' of the shaft-iron are to be passed down over the ends of the draft-brackets D D, and the sleeve $e$ is to be entered into the draft-slot $b$, and the ring of the tumbler-latch is to be made to enter the slot $a$. The tumbler-latch is then to be turned down from dotted lines to position of full lines in Fig. 5, when the parts will be coupled together in a secure manner. The binding-strap $s$ is then to be secured, substantially as shown in Fig. 5.

A reversed order of operations will disconnect the parts and permit a removal of the shaft or pole.

It will be readily seen that by the ring of the tumbler-latch binding on the sleeve $e$, surrounding the draw-bolt F, and the shoulders of the latch binding on the outer curvature of the draw-bracket, the said sleeve and its inclosed bolt will be securely held down in the transverse slot in the draft-bracket D D.

It will also be readily seen that when the said sleeve and its inclosed draw-bolt are thus held in place, and the said draw-bolt is prevented from turning in the ears of the shaft-iron, there will be no pivotal movement of the sleeve *e* in the draft-slot *b*, while the said pivotal movement will be confined in the tubular rubber packing *d*, and with the draw-bolt F working in the said rubber packing.

By these features I produce a coupling which will effectually prevent the parts from becoming worn by the friction of metal against metal, while at the same time the parts may be readily connected or disconnected.

It is evident that it is not always essential that the draft-bracket D D should be made with the clip, as it may be made with the clip-tie, as has been made in cup shackles or couplings heretofore.

It is also evident that two tumbler-latches, one at or near each end of the bushing, may be employed with advantage in some cases.

Having described my invention, what I claim, and desire to secure by Letters Patent, is—

1. The combination, with the shaft-iron E, provided with the ears E' E' and clip C, with slotted bracket D, made in one piece therewith, of the tumbler-latch G, provided with a loop, *h*, the sleeve *e*, and feathered bolt F, substantially as described, and for the purpose set forth.

2. The combination, with the shaft-iron E, constructed as set forth, and clip C, having the slotted bracket D, of the tumbler-latch G, having loop *h*, and binding-strap *s*, substantially as described, and for the purpose set forth.

JOHN C. GOOLD.

Witnesses:
JAMES GOOLD,
ALEX. SELKIRK.